United States Patent [19]
Carte et al.

[11] Patent Number: 4,593,562
[45] Date of Patent: Jun. 10, 1986

[54] GAS METER

[75] Inventors: Michel Carte, Reims; Michel Benadassi, Orainville 02190 Guignicourt; Michel Dumay, Jonchery Sur Vesle, all of France

[73] Assignee: FLONIC, Montrouge, France

[21] Appl. No.: 620,245

[22] Filed: Jun. 13, 1984

[30] Foreign Application Priority Data

Jun. 14, 1983 [FR] France ................... 83 09791

[51] Int. Cl.⁴ .............................................. G01F 3/20
[52] U.S. Cl. .................................................... 73/266
[58] Field of Search ................. 73/266, 267, 265, 268, 73/263

[56] References Cited

U.S. PATENT DOCUMENTS

| | | | |
|---|---|---|---|
| 3,161,049 | 12/1964 | St. Clair et al. | 73/267 |
| 4,014,212 | 3/1977 | Douglas | 73/267 |
| 4,422,324 | 12/1983 | Esola | 73/266 |

FOREIGN PATENT DOCUMENTS

| | | | |
|---|---|---|---|
| 0081641 | 6/1983 | European Pat. Off. | 73/267 |
| 2756163 | 6/1979 | Fed. Rep. of Germany . | |

Primary Examiner—Donald O. Woodiel
Attorney, Agent, or Firm—Dale Gaudier

[57] ABSTRACT

A four chamber gas meter comprises a distributor cover and a rotary distributor sliding on the distributor cover. The distributor is driven by a crank which is kinematically connected to the bellows of the gas meter. The hub of the crank is engaged with clearance in a sleeve of the distributor so that the tilting torque applied to the crank is not applied to the distributor itself.

13 Claims, 12 Drawing Figures

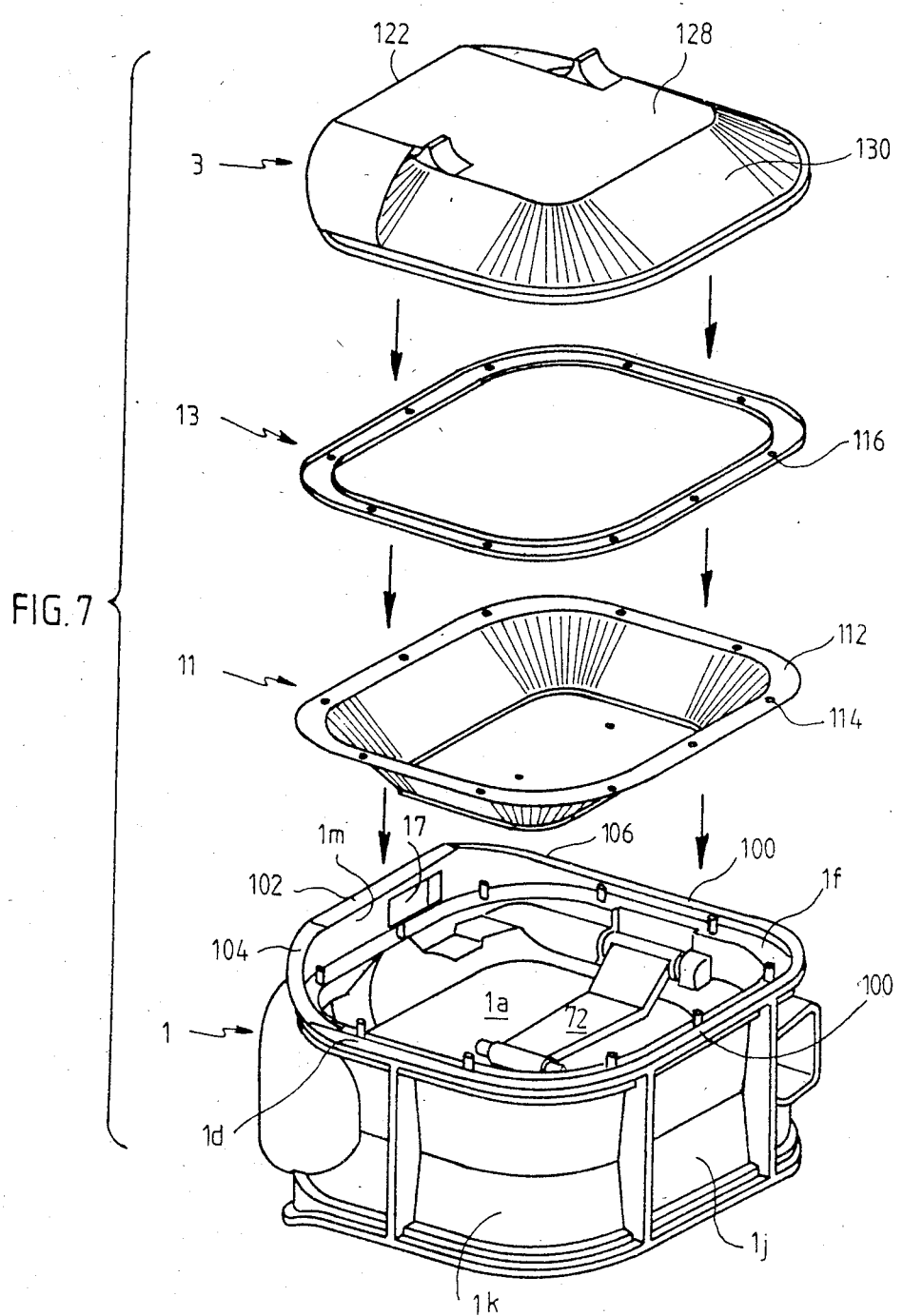

GAS METER

BACKGROUND OF THE INVENTION

This invention relates to gas meters and more particularly to a gas meter of the bellows type.

These meters are well known and one embodiment is described in British Pat. No. 1 508 307. It consists essentially of two measurement spaces, each space being separated into two measurement chambers by a deformable bellows. Each measurement chamber has an orifice for the admission and exhaustion of the gas to be measured.

To synchronize the admission and exhaustion of the gas in the chambers with the position of the bellows, each bellows is associated with a transmission system which controls a distributor which cyclically places the orifices associated with the chambers in communication with the gas inlet into the meter or with the gas outlet.

The distributor can be of the linear displacement type, as in the case of the meter described in the British patent mentioned above, or of the rotary displacement type. In the latter case, the orifices associated with the chambers are arranged on a circular ring and the distributor rotates about the axis of this ring.

The distributor slides on a slide face in which are provided orifices, and the sealing between the distributor and the slide face is provided only by the weight of the distributor and by the difference in gas pressure within the distributor and outside of it owing to pressure drops. To obtain good sealing, a requirement for obtaining a meter having good accuracy, it is necessary for the wear on the face of the distributor in contact with the slide face to be regular. However, in prior-art systems, the distributor drive means introduce an additional tilting torque on the distributor, i.e., in addition to rotation of the distributor about its axis perpendicular to the slide face, the drive means apply a torque to the distributor tending to make it turn around an axis perpendicular to its normal axis of rotation. This results in irregular wear on the bearing surface of the distributor and produces leaks, thus preventing correct operation of the gas meter.

SUMMARY OF THE INVENTION

To overcome these drawbacks, it is an object of the invention to provide a bellows-type meter with a rotary distributor in which the means for imparting rotation to the distributor do not introduce a tilting torque on it.

To accomplish this, the meter comprises a measurement unit including a case forming two measurement compartments, each compartment being separated by a deformable bellows into two chambers and a distribution surface in which are provided four orifices, each orifice being linked with one of said chambers, a distributor mounted movably on said distribution surface, and transmission means for connecting said distributor kinematically to said bellows, said transmission means comprising at least two lever assemblies, the meter being characterized by the fact that the distributor is mounted rotatably and comprises a cylindrical sleeve placed perpendicular to said distribution surface along the axis of rotation of said distributor, and in that said transmission means further comprise a part forming a crank with a hub engaged with clearance in said sleeve and mounted pivotably in relation to said case and a first pivoting shaft parallel to said hub but offset in relation to the latter, one end of said lever assemblies being mounted in said first pivoting shaft, and means for securing the joint rotation of said part forming a crank and said distributor.

Thus, thanks to the clearance existing between the hub and the sleeve of the distributor, the tilting torque liable to be applied to the crank by the lever assemblies is not transmitted to the distributor itself.

In gas meters with four chambers, for example the one described in British Pat. No. 1 508 307, the case of the meter is made up of a central block having a central core, and two side covers. The periphery of each of the two bellows is gripped between an edge of the central block and the edge of one of the side covers. In addition, if the central block has structural elements to define the internal passages associated with the two internal chambers (the ones defined by the central block), one part of the structural elements defining the internal passages associated with the two external chambers (the ones defined by the two side covers) forms an integral part of the two side covers.

Such an arrangement of the case of the meter is a delicate feature which does not allow assembly by automatic means.

Another object of the invention is thus to provide a gas meter with four chambers having a case with a special structure to facilitate assembly and in particular to allow assembly by automatic means when said case is made of heat-sealed plastic materials.

For this purpose, the gas meter has a measuring unit with a case forming two measurement compartments, each compartment being separated by a deformable bellows into two chambers and a distribution area in which are provided four orifices, each orifice being linked with one of said chambers by internal passages, a distributor mounted movably on said distribution area, and transmission means for linking said distributor kinematically to said bellows, said transmission means comprising at least two lever assemblies, said meter being characterized in that said case is made up of a central block and of two side covers secured with said central block said central block comprising all the structural elements defining said internal passages.

BRIEF DESCRIPTION OF THE DRAWINGS

Other characteristics and advantages of the invention will appear more clearly from the following description of an embodiment of the invention given as an illustrative example. The description refers to the appended drawings in which:

FIG. 6b is a view of the central block in a section along the line B—B of FIG. 6a;

FIG. 6c is a veiw of the central block in a section along the line C—C of FIG. 6a;

FIG. 6d is a view of the central block in a section along the line D—D of FIG. 6a;

FIG. 7 is an exploded perspective view showing one method of assembling the bellows and the side covers of the central block.

DETAILED DESCRIPTION OF THE INVENTION

Figure 1:
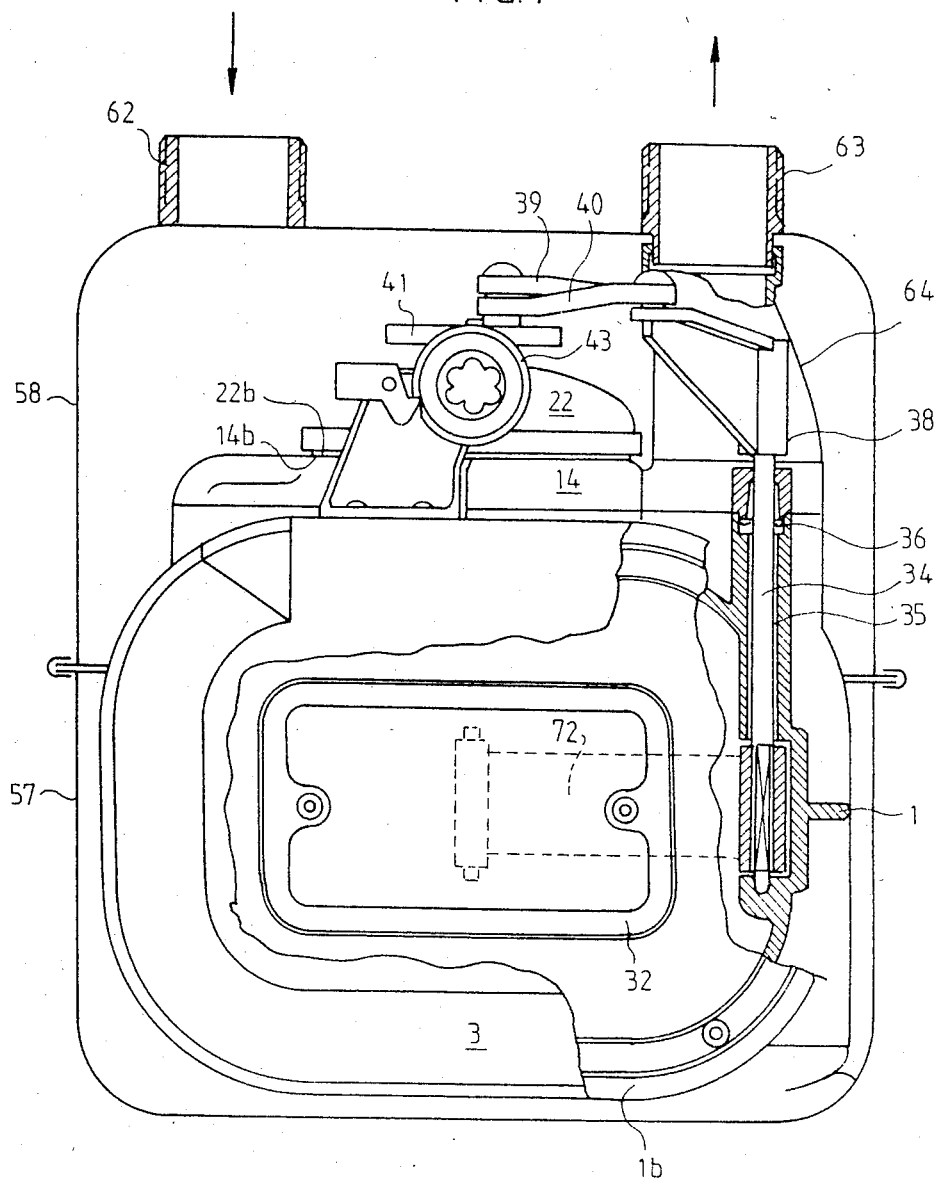
FIG. 1 is a partial vertical section of the meter according to the invention.

In a conventional manner, the meter is composed essentially of a sealed external casing A, a measurement unit B placed inside the casing A and a totalizer C which makes it possible to display mechanically the volume measured by the measurement unit B.

The measuring unit B comprises first of all a case D which includes a central block 1 and two side covers respectively 2 and 3. As shown more particularly in FIGS. 6a to 6d, the central block 1 includes a central partition 1a placed along the main longitudinal plane of the central block with a bottom 1j substantially perpendicular to the central partition 1a and two side walls 1k. The upper part of the central block, which is more complex, will be described later. Covers 2 and 3 are welded on coupling surfaces forming the edge of the bottom 1j, of the side walls 1k and of the top of the central block 1. For example, we see the coupling surfaces 1c and 1d which are welded with the coupling surfaces 2a and 3a of the covers 2 and 3. This assembly made up of the central block and the side covers defines two spaces separated by the central partition 1a and noted respectively 4 and 5. These spaces will hereinafter be called compartments. In a well known manner, each compartment 4 and 5 is separated into two chambers by a deformable bellows or diaphragm. For the compartment 4 we find the bellow 10 and for the compartment 5 the bellows 11. Thus, compartment 4 is separated by bellows 10 into a chamber 6 and a chamber 7. Symmetrically, the bellows 11 separates the compartment 5 into a chamber 8 and a chamber 9. The periphery of each bellow is gripped between internal shoulders provided in the bottom 1j, the side walls 1k, and the upper part of the central block 1, noted respectively 1e and 1f and clamps noted respectively 12 and 13. The case D also includes, on its upper part, a distribution cover 14 which is welded or glued on the upper part of the central block 1 which will be described later.

Figure 2:
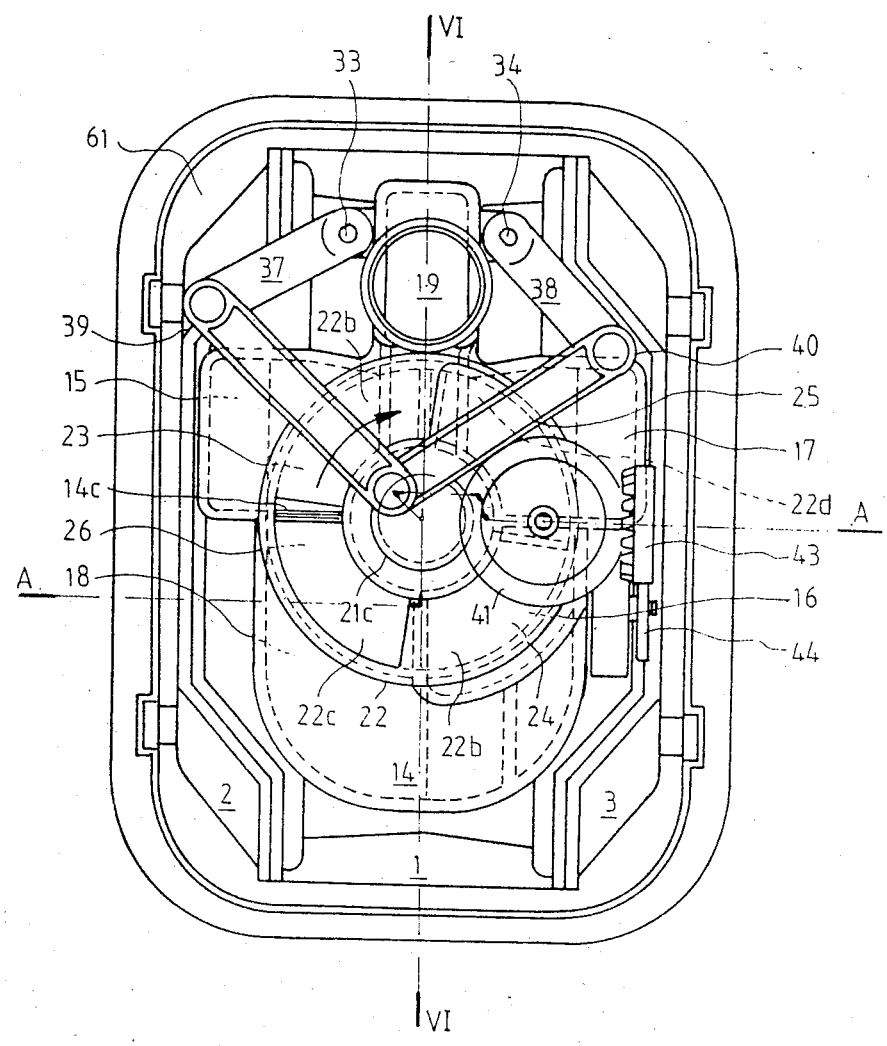
FIG. 2 is a top view of the meter, the upper part of the external casing being removed.

The distribution cover 14 and the upper part of the central block 1 also define internal passage noted respectively 15, 16, 17 and 18. These parts also define a central outlet passage 19 which can be seen better in FIGS. 3b and 4. As seen in FIG. 2, the upper side 14b of the distribution cover 14 has four openings, each having the form of a quarter sector of a circle which are noted respectively 23, 24, 25 and 26, separated by radial sealing strips 14c. The upper side 14b forms a seat or slide face in which are made the four openings already described. The internal passages 15 to 18 are designed to link each chamber 6 to 9 with one of the openings 23 to 26. More precisely, the chambers 6, 7, 8 and 9 are placed in communication with the openings 23, 24, 25 and 26 respectively by the internal passages 15, 16, 17 and 18.

Figure 6A:
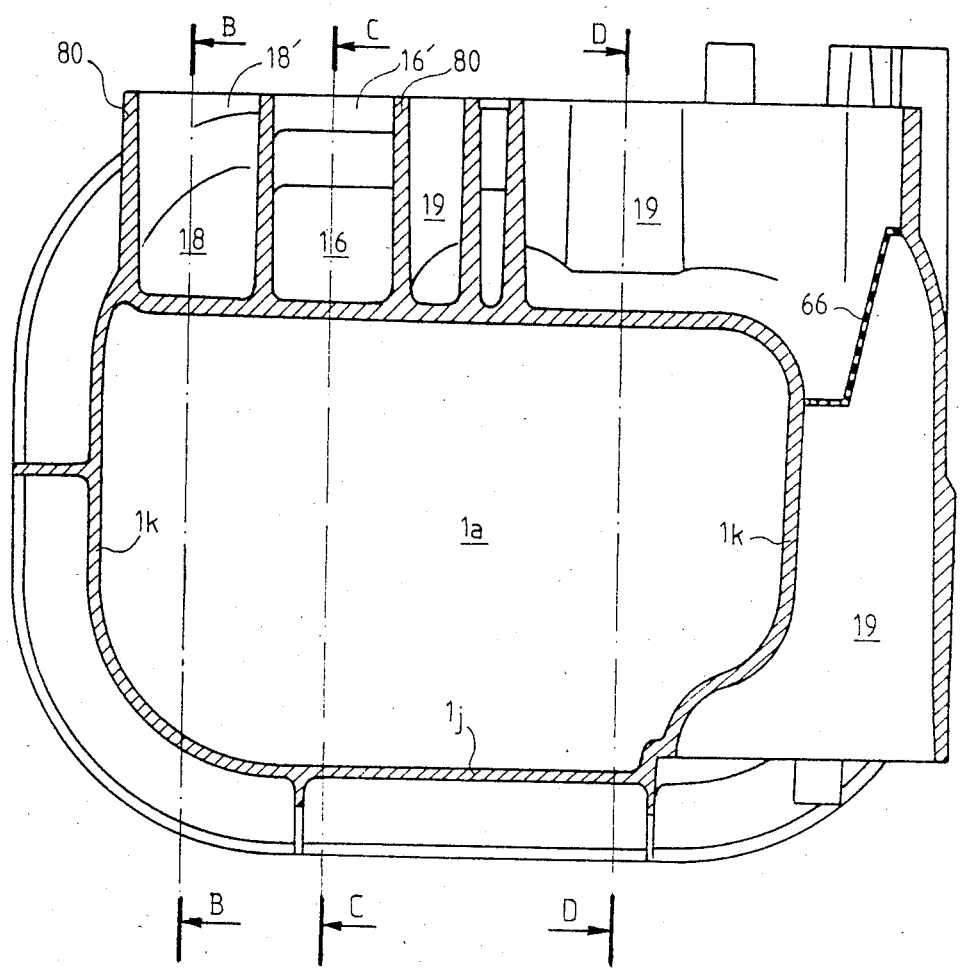
FIG. 6a is a view of the central block of the case of the meter in a section along the line VI—VI of FIG. 2.
Figure 6C:
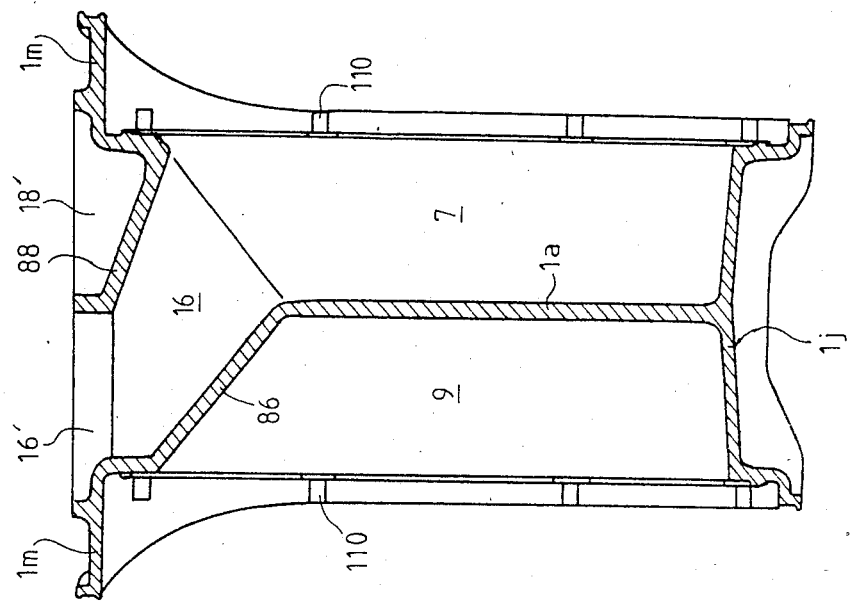
Figure 6B:
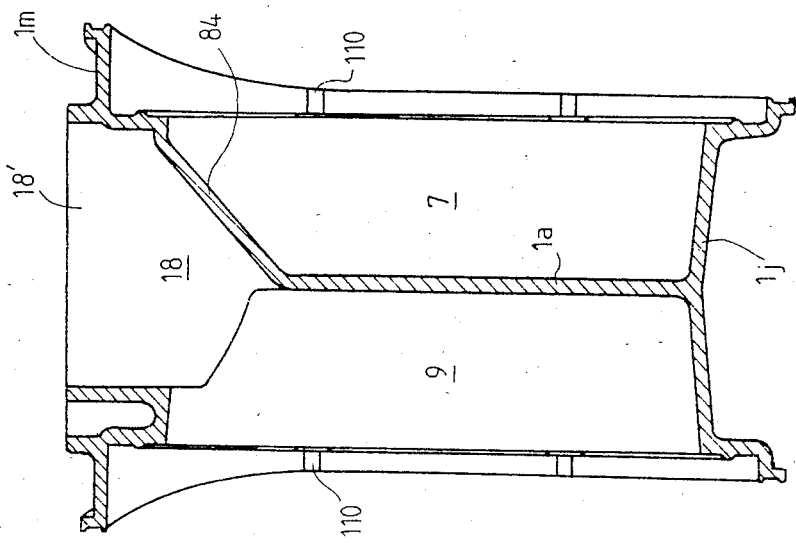
Figure 6D:
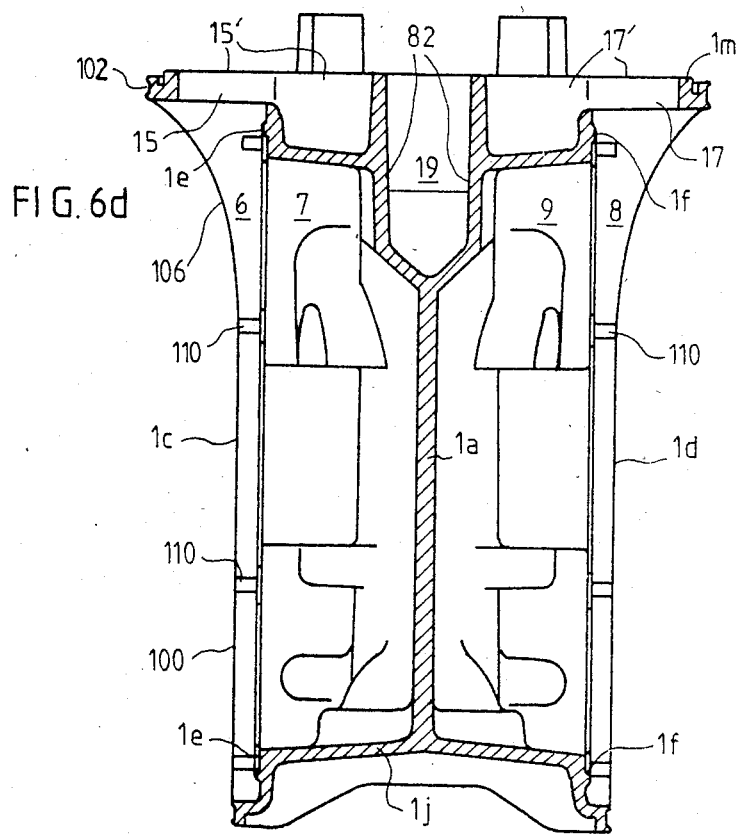
Figure 6E:
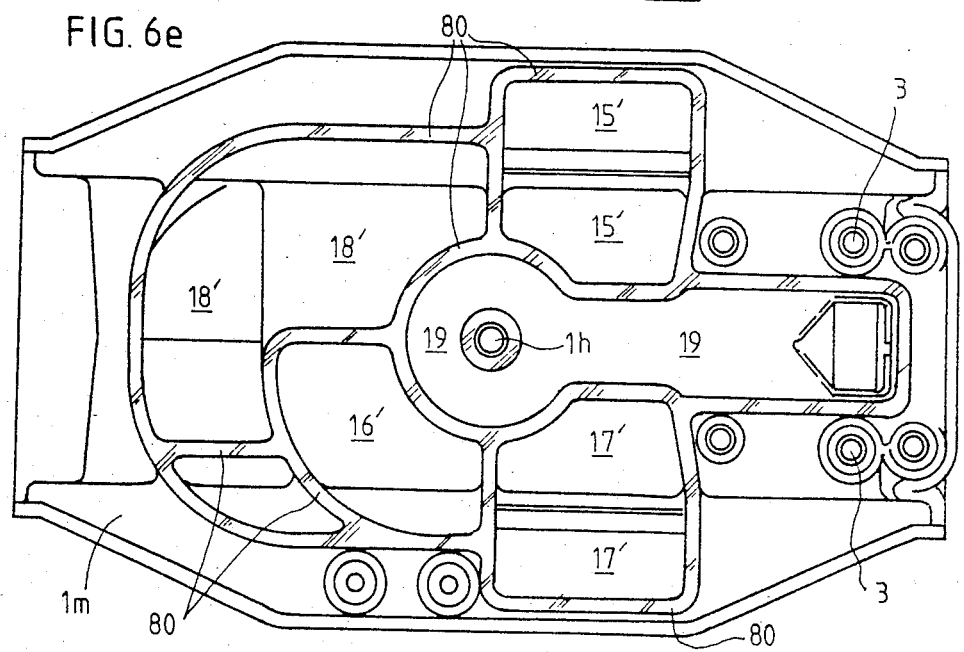
FIG. 6e is a top view of the central block of the meter case.

Referring more particularly to FIGS. 6a to 6e, it will be possible to better understand how the passages 15 to 18 are designed. FIG. 6e shows that the upper part of the central block 1 comprises an upper wall 1m from which lead out the orifices separated by partition elements parallel to the central partition 1a and which are given the general reference 80. It is on the free upper end of the partition elements 80 that is fixed the distribution cover 14. The orifices form the end of the passages 15 to 19. In FIG. 6e these orifices are marked with the reference of the passage of which they form the end, but their reference carries a prime symbol. The purpose of the distribution cover 14 is to link the orifices 15' to 18' to the openings 23 to 26 in a sealed manner.

FIG. 6d shows that the internal passage 17 is reduced to a hole, also noted 17, pierced in the upper wall 1m of the central block which provides direct communication between the chamber 8 and the orifice 17' and that the internal passage 15 is reduced to a hole, also noted 15, pierced in the upper wall 1m of the central block and which provides direct communication between the chamber 6 and the orifice 15'. The central passage 19 is limited by a U-shaped partition noted 82 and whose top is connected to the upper periphery of the central partition, at least over part of its length, as shown in FIG. 6a.

FIG. 6b shows that the passage 18 which provides communication between the chamber 9 and the orifice 18' in FIG. 6e is limited by an inclined partition 84 connected to the partition elements of FIG. 6e surrounding the orifice 18'.

FIG. 6c shows that the internal passage 16 which links the chamber 17 to the orifice 16' of FIG. 6e is limited by a first inclined partition 86 which extends from the periphery of the central partition 1a to one of the partition elements surrounding the orifice 16' through a second inclined partition 88 separating the passage 16 from part of the orifice 18' and through the partition elements of FIG. 6e surrounding the orifice 16'.

The preceding description, given in connection with FIGS. 6a to 6e, shows that according to an important feature of the invention all the internal passages 15 to 18, as well as the central passage 19, are defined by structural elements belonging to the central block 1. The distribution cover 14 is designed simply to connect the orifices 15' to 18' of the central block to the distribution openings 23 to 26. Thus, the side covers 2 and 3 do not have any element defining internal passages.

The measurement unit also includes a rotary distributor bearing the general reference 22. The lower side 22' of the distributor 22 slides on the seat or slide face via the top side 14b of the distribution cover 14. More precisely, the side 14b is provided with strips or ribs 14d, seen better in FIG. 3b, which cooperate with the lower sides 22' of the distributor to provide the required sealing. The distributor is made up of four sectors of a circle which consist respectively of an orifice 22c and a dished zone 22c separated by two flat zones 22b. Each of these four zones correspond to an angle of 90°. The distributor also has a hollow central zone 22f which communicates with the hollow dished zone 22d. It is easily understood that the orifice 22c is designed to place each opening successively in communication with the exterior of the central unit limited by the casing A, that the dished zone 22d and the central zone 22f are designed to place the central passage 19 in communication with one of the openings while isolating the assembly with respect to the exterior of the measurement unit and that the flat zones 22b close off the openings successively.

In a well-known manner, the rotation of the distributor makes it possible to control the admission and exhaust of the gases in the different measurement chambers.

Meters with four chambers and a rotary distributor are well-known in themselves and described, for example, in U.S. Pat. No. 3,161,049. It is thus unnecessary to describe here in detail the operation of such a meter, i.e. the relationship between the position of the rotary distributor and the position of the bellows in the measurement compartments. One need only refer to the document mentioned above.

Figure 3A:
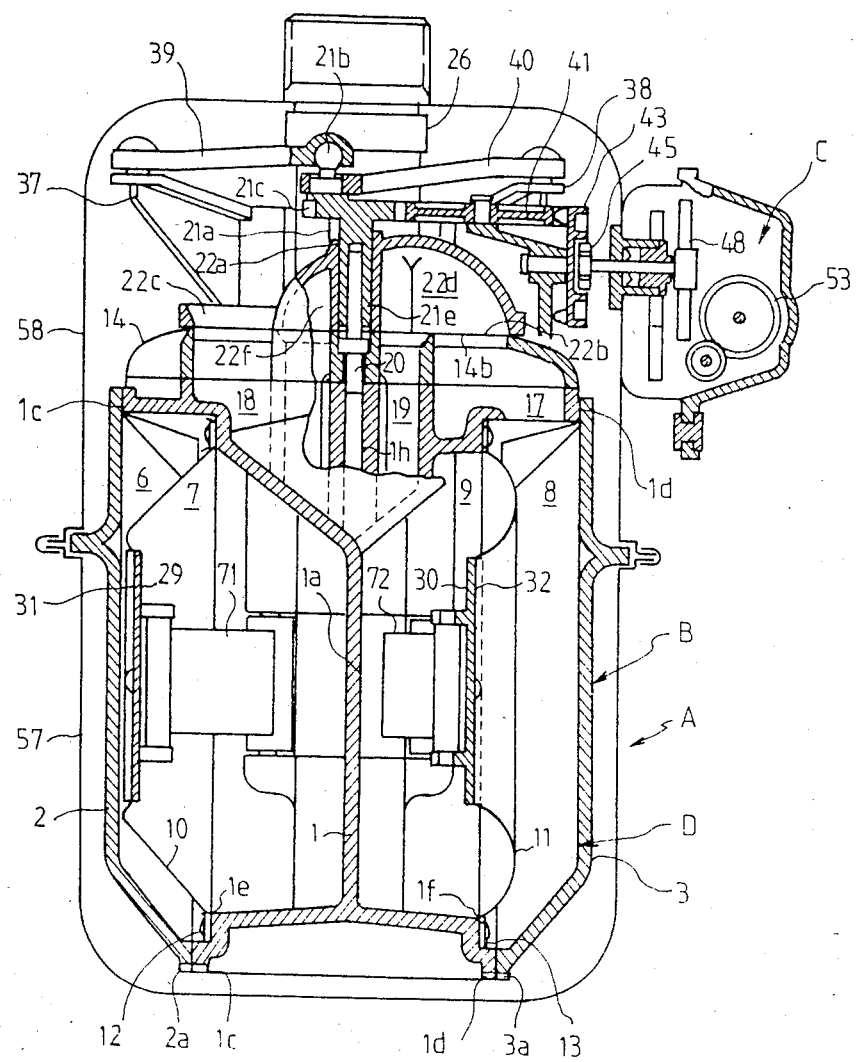
FIG. 3a is a vertical section along the broken line A—A of FIG. 2.
Figure 3B:
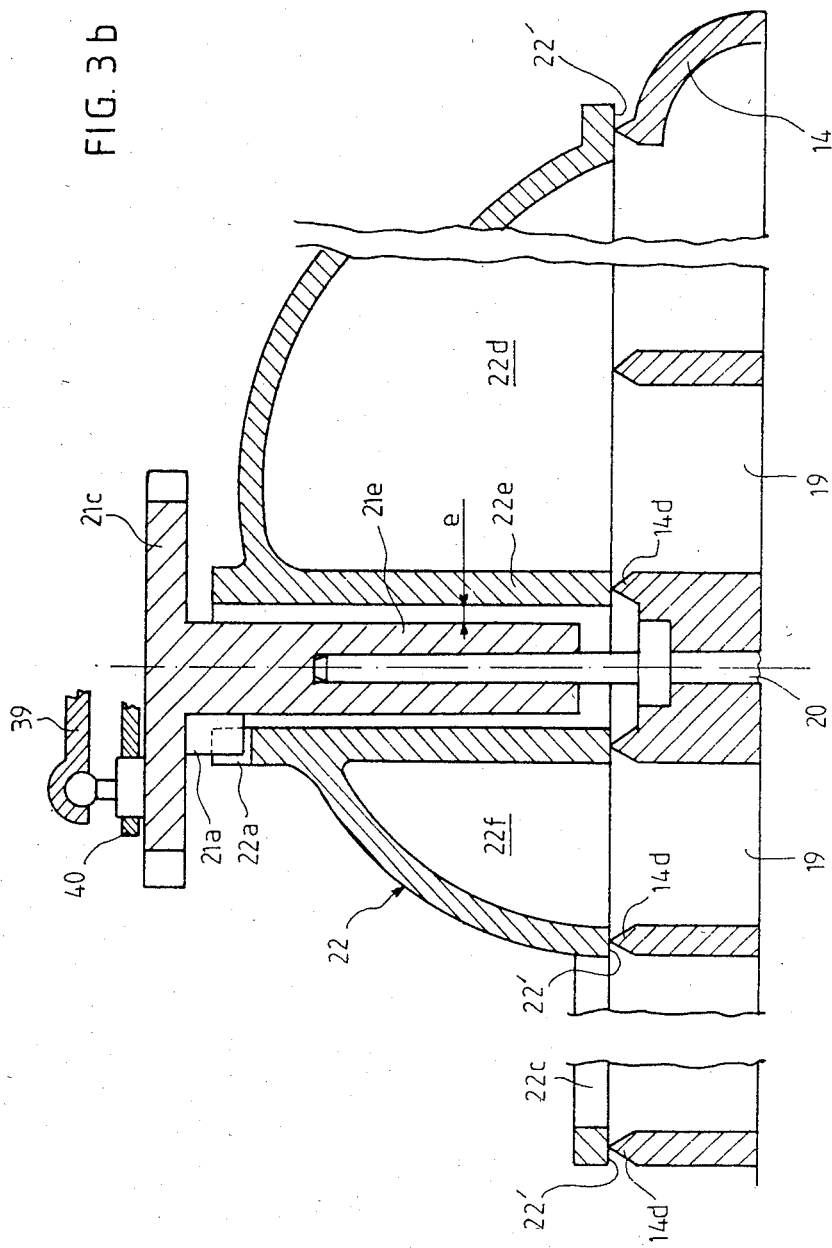
FIG. 3b is a detail view of FIG. 3a showing more particularly the mounting and driving of the distributor.

As shown in greater detail in FIG. 3b, to provide synchronization between the movement of the bellows and the rotation of the distributor 22, a part 21 forming a crank is first of all provided. The crank 21 can thus rotate about the shaft 20 which is placed along the geometrical axis of the openings 23 to 26. The hub of the crank is also engaged in a sleeve 22e integral with the distributor 22. The sleeve 22e is placed along the geometrical axis of the circular side of the distributor 22 in contact with the side 14b of the distribution cover. The hub 21e is engaged freely with a very slight clearance (exaggerated in FIG. 2b), for example 1/10 of a millimeter, in the sleeve 22e. Sealing is obtained be one of the strips 14d which is circular, provided in the distribution cover 14 and which cooperates with the lower end of the sleeve 22e. The crank 21 also has a toothed wheel 21c which drives the totalizer C as will be explained later, as well as a crank pin 21b offcentered with respect to the axis of the hub 21c. Finally, the crank 21 and the distributor 22 are made to rotate together by the cooperation of a lug 21a provided in the crank 21 and a radial groove 22a provided in the distributor 22.

Coming back to the bellows 10 and 11 shown more particularly in FIG. 3a, we see that they are gripped in their central part respectively between plates 29 and 30 and counter-plates 31 and 32. Arms noted respectively 71 and 72 are connected pivotally respectively to the center of the plates 29 and 30. As can be seen better in FIGS. 1 and 2 the other end of the arms 71 and 72 are connected to rotate together with the lower end of vertical shafts noted respectively 33 and 34. The shafts 33 and 34 are mounted pivotally in passages 35 provided in the central block 1. The shafts 33 and 34 go through the part 1 in a sealed manner thanks to the seal 36.

The upper end of the shafts 33 and 34 rotates respectively with the first levers noted 37 and 38 respectively. The mean positions of these levers form a characteristic angle of 90° between them and the length of these levers is such that the lines going through the end point of the arcs generated by the rotation of said levers intersects with the axis of rotation of the distributor 22 while forming a characteristic angle of 90°. This arrangement makes it possible to use only one simple crank. The levers 37 and 38 are connected by their second end to connection rods noted respectively 39 and 40. These connection rods are mounted on the crank pin 21b.

It is easily understood, from the preceding description, that the movements of the bellows 10 and 11 lead to corresponding rotations of the shafts 33 and 34. The rotation of these shafts in turn leads to a corresponding rotation of the distributor 22 via the lever assemblies 37/39 and 38/40. Thus, the admission or exhaust of the chambers 6 to 9 is controlled in synchronism with the movement of the bellows. Moreover, with such a drive system it is possible to provide a certain admission lead, i.e. the introduction of gas into a chamber is allowed before the bellows reaches the end of its travel without it being necessary to use a travel stop system. This makes it possible to define with better accuracy the end position of the bellows and hence the useful volume of the chamber.

Referring to FIG. 3a, it is seen that the external casing A is made up of two half-casings 57 and 58, respectively lower and upper. The upper half-casing 58 is equipped with a gas inlet nozzle 62 and a gas outlet nozzle 63. The outlet nozzle 63 is connected via the line 64 to the internal outlet passage 19 by means of the orifice 65 provided in a perforable zone 65' of the distribution cover 14 located outside the area swept by the distributor 22.

Finally, the totalizer C, which can been seen in FIG. 2a, comprises measurement display drums 53. These drums are connected kinematically to the wheel 21c of the crank 21 through a set of toothed wheels given the references 41, 43, 45 and 48, not requiring more detailed description.

As an alternative, it is possible to provide between the sleeve 22e and the hub 21e a clearance e which is not negligible, for example of the order of 1 mm. Under the effect of the rotation of the crank 21, the distributor 22 is rotated around an axis varying randomly owing to the clearance e which is no longer negligible. The movement of the distributor is thus offcentered in relation to the axis of rotation of the hub 21e.

Consequently, the contact surface between the strips 14d of the distribution cover and the lower side 22' of the distributor 22 varies at the same time as the axis of rotation of the distributor. The result is that the wear of the lower side 22' of the distributor 22 involves a much greater portion of this lower side, this portion being defined by the clearance e. Thus, the wear of the side 22' of the distributor 22 is much more regular.

It is important to come back in greater detail to the particular method used for imparting rotation to the distributor.

In addition to the rotary drive of the distributor, the sets of levers 37–39 and 38–40 are liable to apply a tilting torque to the distributor, as already explained. According to the invention, this tilting torque is applied to the assembly which forms the crank 21. Owing to the clearance between the hub 21e of the crank and the sleeve 22e of the distributor, and as the only link between the crank 21 and the distributor 22 is through the cooperation of the lug 21a and groove 22a, the tilt is applied to the crank but is not transmitted to the distributor itself. There is thus regular wear on the face of the distributor in contact with the slide face 14b.

Figure 4:
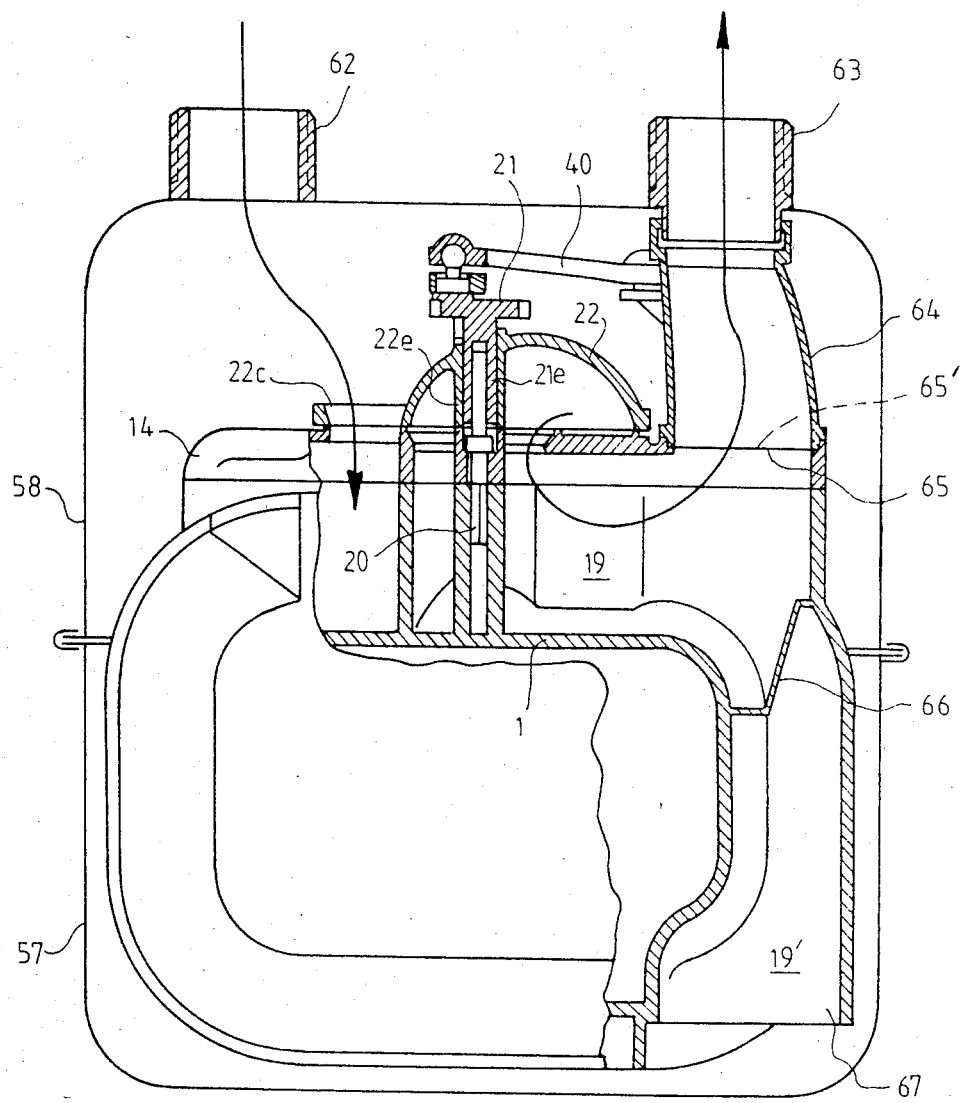
FIG. 4 is a vertical partial section along a plane parallel to the one in FIG. 1.

In the embodiment described and represented in particular in FIG. 4, the gas enters and leaves the meter at the top of the casing A. According to a characteristic of the invention, the meter is designed so that, through some simple machining and assembly operations, the introduction of the gas into the casing always takes place on top of the casing, but the outlet of the gas takes place at the bottom, substantially in the extension of the inlet. To accomplish this, the central block 1 and the side covers 2 and 3 define an internal passage 19' separated, in FIG. 4, from the passage 19 by a perforable thin partition 66. The passage 19' comes out through the orifice 67 at the lower end of the case D.

To obtain the inlet-outlet system of FIG. 4, it can be seen that it is sufficient to pierce the orifice 65 in the zone 65' of the distribution cover 14, to provide the inlet and outlet nozzles 62 and 63 as shown in FIG. 4 and to install the line 64.

Figure 5:
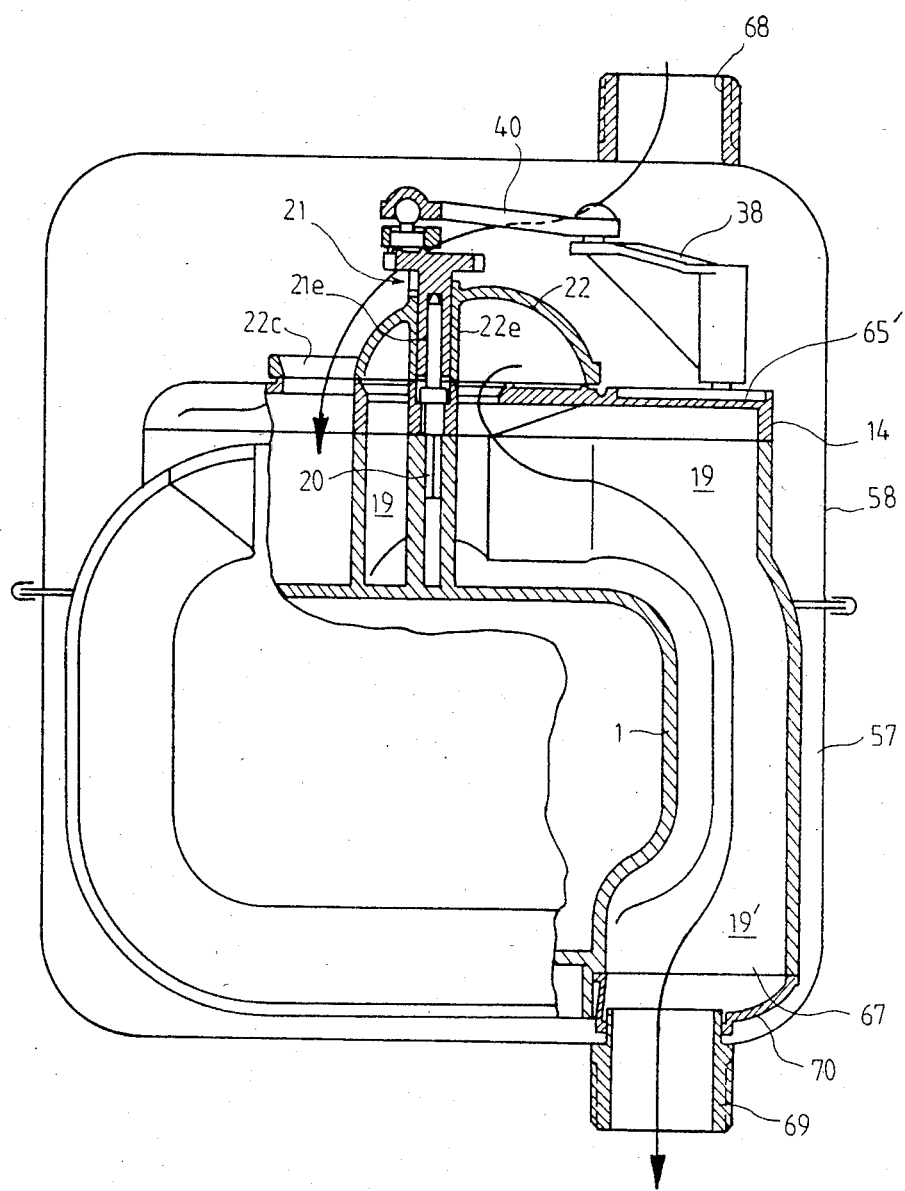
FIG. 5, similar to FIG. 4, shows another embodiment of the introduction and removal of the gas in and out of the meter casing.

To obtain the inlet-outlet system of FIG. 5, no orifice is pierced in the distribution cover 14, but the thin partition 66 is eliminated so that the internal passages 19 and 19' communicate. In addition, on the casing A is installed the inlet nozzle 68 which plays the same role as the nozzle 62 of FIG. 4 and the outlet nozzle 69 placed at the bottom of the casing A. Finally, the outlet nozzle 69 and the orifice 67 are connected by the line 70.

The preceding description shows that, by producing a single type of case, it is possible to obtain meters with both inlet and outlet systems, requiring only a very limited number of special machine operations. For the assembly of FIG. 4, it is sufficient to pierce the orifice 65 in the zone 65' of the inlet cover 14. For the assembly of FIG. 5, one need only eliminate the thin partition 66 which is easily accessible.

Referring more particularly to FIGS. 6d and 7, we shall now describe in detail a preferred embodiment for the mounting of the bellows and the side covers of the central block 1 when the case of the meter is made of a plastic material.

FIG. 6d shows that the side wall 1k, 1j, 1l, of the central block 1, which is connected to the partition 1a, has two coupling surfaces 1c and 1d for the attachment of the side covers 2 and 3. These coupling surfaces 1c and 1d are not entirely flat. Each surface has a flat portion 100 corresponding to the bottom of the case 1j and to the larger part of the side faces of the case 1k arranged in a plane parallel to that of the partition 1a, another portion 102 which is also flat but placed in a different plane from that of the portion 100, parallel to the latter and corresponding to the upper side 1m on which is fixed the distribution cover 14, these two flat portions 100 and 102 being connected by two curved portions 104 and 106.

The curved portions 104 and 106 are generated by a straight line which moves while remaining parallel to the central partition 1a and perpendicular to the upper side 1m of the central block. As already indicated, the central block also defines two shoulders noted respectively 1e and 1f. These shoulders are flat and are placed symmetrically in relation to the central partition 1a in the planes parallel to this partition. The plane of each shoulder is internal with respect to the plane in which is located the first flat portion 100 of the corresponding connecting surface. Each shoulder 1e, 1f has nipples such as 110 cast integrally with the rest of the central block 1. The plane of the shoulder 1f is placed between the passage 17 associated with the chamber 8 and the origin of the passage 18 associated with the chamber 9. A similar arrangement is provided for the shoulder 1e.

FIG. 7 illustrates the different phases of the installation of the bellows and side covers. The end of the arm 72 is first mounted pivotably on the plate 30 integral with the bellows 11. The flat periphery 112 of the bellow is then placed on the shoulder 1f such that the nipples 110 penetrate into the holes 114 provided in the periphery 112 of the bellow . The clamp 13, equipped with the corresponding orifices 116, is then fitted. This clamp 13 is applied with pressure on the periphery of the bellows, and the heads of the nipples 110 are deformed ultrasonically to obtain a sealed attachment of the periphery 112 of the bellows on the shoulder 1f.

The upper part of FIG. 7 shows that the side cover 3 has a coupling surface 3a which is combined with the coupling surface 1d of the central block 1. More precisely, the coupling surface has a flat portion 120 corresponding to the portion 100 of the coupling surface 1d, a second flat portion 122 corresponding to the portion 102 and two curved portions 124 and 126 corresponding to the portions 104 and 106 of the surface 1d.

As shown in FIG. 7, the side cover 3 has a flat part 128 which extends the portion 122 of the coupling surface and an inclined part 130 which connects the flat part 128 to the part 120 of the coupling surface 3a, this inclined part 130 moreover being limited by the curved portions 124 and 126 of the coupling surface 3a.

The side cover 3 is fixed on the central block 1 by friction welding. To accomplish this, the cover 3 is placed on the central block 1 so that the coupling surface 3a of the cover is in contact with the coupling surface 1d of the central block. Then, while applying a sufficient force on the part 128 of the cover 3, the central-block-1/slide-cover-3 assembly is subjected to a relative vibratory movement along the direction F which is perpendicular to the upper part 1m of the central block. This is possible owing the definition given previously of the two coupling surfaces. The combination of the applied force and the relative vibratory movement causes local heating of the coupling surfaces and hence welding. Of course, the cover 3 is made of thermoplastic material identical to, or compatible with the one used for the central block. One thus obtains a sealed attachment between the central block 1 and the side cover 3.

A similar procedure is used for the fitting of the bellow 10 and the side cover 2 respectively on the cover 1e and on the coupling surface 1c.

The heat-sealable material is preferably a fiberglass-charged butylene terephthalate polyester. The pressure exerted perpendicular to the covers is of the order of 700 daN. The vibrations applied to the covers parallel to the coupling surfaces have a frequency of the order of 200 Hz and an amplitude of from 0.7 to 1.5 mm.

Such an embodiment of the case of the meter has many advantages compared with techniques customarily used. It should be added that this embodiment of the case can be applied just as well to a four-chamber meter with a distributor of the linear displacement or oscillation type.

The fact that all the internal passages 15 to 18 connecting the chambers to the distribution cover 14, as well as the central passage 19, are made in the central block, simplifies sealing problems between the central block and the side covers. In fact, in designs in which the side covers serve to define part of the internal passages, those associated with the two external chambers, special seals must be provided for these internal passages.

In addition, the separation between the attachment of the bellows and the attachment of the side covers on the central block makes it possible to simplify substantially the assembly of the meter and to allow its automation compared with prior-art techniques in which the periphery of the bellows is secured between an edge of the central block and an edge of one of the side covers. In such prior-art techniques, an extra thickness must be provided on the periphery of the bellows to ensure the double sealing between the bellows, the central block and the side cover. On the contrary, according to the invention, since the sealing must be provided directly between the central block and the side covers, it is possible to use friction welding, which would be impossible if a seal had to be placed between these two parts.

Flnally the very form of the side covers offers two advantages compared with a design in which the covers are flat. Firstly, the presence of the inclined portion 130 makes it possible to strengthen the cover, and, secondly, this same inclined portion allows a reduction in the overall dimensions of the meter, notably by enabling the use of a lower casing 57 which has rounded portions without increasing the external dimensions of the casing.

What is claimed is:

1. Gas meter with a measurement unit comprising:
   a case made up of a central block, a distribution cover defining a distribution surface equipped with four distribution orifices fixed to said central block and two side covers also fixed to said central block to define two internal compartments;
   two deformable bellows each mounted in one of said compartments to separate each compartment into two measurement chambers, said central block moreover forming all four internal passages to connect each distribution orifice to one of said chambers;
   a distributor mounted rotatably on said distribution cover and comprising a cylindrical sleeve placed perpendicular to said distribution surface along the axis of rotation of said distributor; and
   transmission means comprising a part forming a crank including a hub engaged with clearance in said sleeve and mounted pivotably in relation to said case, and a first pivot shaft parallel to said hub but offset in relation to it, means for connecting said bellows kinematically to said part forming a crank comprising at least two lever assemblies, one end of said lever assemblies being mounted on said first pivot shaft, and means for obtaining the joint rotation of said crank part and said distributor.

2. Gas meter with a measurement unit including a case forming two measurement compartments, each compartment being separated by a deformable bellow into two chambers and a distribution surface in which are provided four orifices, each orifice being connected to one of said chambers by internal passages, a distributor mounted rotatably on said distribution surface and comprising a cylindrical sleeve placed perpendicular to said distribution surface along the axis of rotation of the distributor, and transmission means comprising a part forming a crank having a hub engaged with clearance in said sleeve and mounted pivotably in relation to said case and a first pivot shaft parallel to said hub but offset in relation to it, means for connecting said bellows kinematically to said crank part, one end of the lever assemblies being mounted on said first pivot shaft, and means for obtaining the joint rotation of said crank part and said distributor.

3. The meter of claim 2 further comprising a second pivot shaft integral with said case, projecting outside of said distribution surface and arranged along the axis of rotation of said distributor, wherein said hub is hollow and mounted pivotably on said second pivot shaft.

4. The meter of claim 2 wherein said joint rotation means comprise a lug integral with said crank part and a slot provided in said distributor and in which is engaged said lug.

5. The meter of claim 2 wherein said distribution surface comprises a circular sealing rib cooperating with the end of said sleeve closest to said distribution surface.

6. The meter of claim 2 further comprising mechanical display means, wherein said crank part moreover comprises a portion forming a toothed wheel having the same axis as said hub and perpendicular to the axis of said hub, said toothed wheel driving said display.

7. The meter of claim 6 wherein said first axis is a shaft integral with said toothed wheel portion.

8. The meter of claim 2 wherein the clearance between said sleeve and said hub is sufficient to allow, under the effect of the rotation of said crank part, a rotational movement of said distributor offcentered with respect to the axis of said hub.

9. The meter of claim 2 wherein said case moreover forms first and second internal passages, said first passage leading out through one end into said distribution surface in the zone swept by said distributor, said second passage having one end leading out through an orifice on the end of said case opposite said distribution surface, said passages being separated by a perforable internal partition, said distribution surface having a perforable zone on the end of the zone swept by said distributor to obtain communication of said first passage with the outside of said case.

10. Gas meter with a measuring unit comprising:
    a case including an integral central block, a distribution cover provided with four distribution orifices and fixed to said central block, and two side covers also fixed to said central block to define two internal compartments;
    two deformable bellows each mounted in one of said compartments to separate each compartment into two chambers, said central block defining four internal passages for connecting each distribution orifice to one of said chambers;
    a distribution assembly mounted rotatably on said distribution cover and outside said case; and
    transmission means for kinematically connecting said deformable bellows to said distribution assembly said transmission means including two shafts, each shaft having a first end inside said case and a second end outside said case.

11. The meter of claim 10 wherein said central block further comprises two shoulders placed in parallel planes, and two coupling surfaces distinct from said shoulders, the periphery of each of said bellows being fixed in a sealed manner on said shoulders and each side cover having an edge equipped with a coupling surface, the side covers being fixed directly to said central block through the coupling surfaces.

12. The meter of claim 11 wherein said central block and said side covers are made of a heat-sealable material and are assembled together by friction welding.

13. The meter of claim 1 wherein said case moreover forms first and second internal passages, said first passage leading out through one end into said distribution surface in the zone swept by said distributor, said second passage having one end leading out through an orifice on the end of said case opposite said distribution surface, said passages being separated by a perforable internal partition, said distribution surface having a perforable zone on the end of the zone swept by said distributor to obtain communication of said first passage with the outside of said case.

* * * * *